(12) United States Patent
Hsieh

(10) Patent No.: US 12,525,307 B2
(45) Date of Patent: Jan. 13, 2026

(54) ONE-TIME PROGRAMMABLE MEMORY CIRCUIT, ONE-TIME PROGRAMMABLE MEMORY AND OPERATION METHOD THEREOF

(71) Applicant: eRaytroniks Co., Ltd., Kaohsiung (TW)

(72) Inventor: E Ray Hsieh, Taoyuan (TW)

(73) Assignee: eRaytroniks Co., Ltd., Kaohsiung (TW)

( * ) Notice: Subject to any disclaimer, the term of this patent is extended or adjusted under 35 U.S.C. 154(b) by 168 days.

(21) Appl. No.: 18/539,622

(22) Filed: Dec. 14, 2023

(65) Prior Publication Data

US 2024/0203515 A1 Jun. 20, 2024

Related U.S. Application Data

(60) Provisional application No. 63/387,692, filed on Dec. 15, 2022.

(30) Foreign Application Priority Data

Nov. 28, 2023 (TW) .................................. 112146137

(51) Int. Cl.
G11C 17/00 (2006.01)
G11C 17/18 (2006.01)
H10B 20/20 (2023.01)

(52) U.S. Cl.
CPC ............. G11C 17/18 (2013.01); H10B 20/20 (2023.02)

(58) Field of Classification Search
CPC ......... G11C 17/06; G11C 17/16; G11C 17/18; G11C 17/12; G11C 16/0483;

(Continued)

(56) References Cited

U.S. PATENT DOCUMENTS

2021/0249426 A1* 8/2021 Sun ........................ G06N 3/065
2022/0181336 A1   6/2022 Chern
2022/0343987 A1  10/2022 Li et al.

FOREIGN PATENT DOCUMENTS

JP     S57-58354 A      4/1982
JP   2013-222879 A    10/2013
(Continued)

OTHER PUBLICATIONS

Stafford Hutchins et al., "A High Output Power 1V Charge Pump and Power Switch for Configurable, In-Field-Programmable Metal eFuse on Intel 4 Logic Technology," 2022 IEEE Symposium on VLSI Technology and Circuits (VLSI Technology and Circuits), 2022, pp. 136-137, doi: 10.1109/VLSITechnologyandCir46769.2022. 9830275.

(Continued)

*Primary Examiner* — Thong Q Le
(74) *Attorney, Agent, or Firm* — CKC & Partners Co., LLC

(57) ABSTRACT

The present disclosure provides a one-time programmable memory, which includes a one-time programmable (OTP) diode and a control field effect transistor (FET). One end of the OTP diode is electrically connected to a source line. The control FET includes a gate, a first source/drain and a second source/drain, the gate of the control FET is electrically connected to a word line, the first source/drain of the control FET is electrically connected to a bit line, and the second source/drain of the control FET is electrically connected to another of the OTP diode.

7 Claims, 13 Drawing Sheets

(58) Field of Classification Search
CPC . G11C 11/4023; G11C 11/4063; G11C 16/04; G11C 16/12; G11C 17/10; G11C 5/025; G11C 7/1015; G11C 7/12; G11C 8/12; G11C 8/14; H10B 20/20; H10B 20/25; H10B 41/20; H10B 41/35; H10B 43/20; H10B 69/00; H10B 63/34; H10N 70/20; H10N 70/231; H10N 70/826; H10N 70/882; H10N 70/8833; H10N 70/8836
See application file for complete search history.

(56) References Cited

FOREIGN PATENT DOCUMENTS

| | | |
|---|---|---|
| JP | 2013-232494 A | 11/2013 |
| KR | 10-2016-0127721 A | 11/2016 |
| KR | 10-2019-0101799 A | 9/2019 |
| TW | 201234379 A | 8/2012 |
| TW | 201519245 A | 5/2015 |

OTHER PUBLICATIONS

Shao-Yu Shaun Chou et al., "A 16-kb Antifuse One-Time-Programmable Memory in 5-nm High-K Metal-Gate FinFET CMOS Featuring Bootstrap High-Voltage Scheme, Read Endpoint Detection, and Pseudodifferential Sensing," in IEEE Solid-State Circuits Letters, vol. 4, pp. 170-173, 2021, doi: 10.1109/LSSC.2021.3115638.

Min-Che Hsieh et al., "Characterization of Multilayer Metal Gate Fuse in 28-nm CMOS Logic Technology," in IEEE Electron Device Letters, vol. 34, No. 9, pp. 1088-1090, Sep. 2013, doi: 10.1109/LED.2013.2272475.

Han-Byul Kang et al., "Electromigration of NiSi poly gated electrical fuse and its resistance behaviors induced by high temperature," 2010 IEEE International Reliability Physics Symposium, 2010, pp. 265-270, doi: 10.1109/IRPS.2010.5488818.

* cited by examiner

ONE-TIME PROGRAMMABLE MEMORY CIRCUIT, ONE-TIME PROGRAMMABLE MEMORY AND OPERATION METHOD THEREOF

RELATED APPLICATIONS

This application claims priority to U.S. Provisional Patent Application No. 63/387,692, filed Dec. 15, 2022 and Taiwan Patent Application No. 112146137, filed Nov. 28, 2023, the entirety of which is herein incorporated by reference.

BACKGROUND

Field of Invention

The present invention relates to storage circuits and operation methods, and more particularly, a one-time programmable memory circuit, a one-time programmable memory and an operating method thereof.

Description of Related Art

The conventional one-control-transistor-one-resistor (1T1R) one-time programmable memory requires a long and narrow conductive liner, whose terminals are attached on wide-and-large metallic pads. Therefore, the 1T1R one-time programmable memory needs large area.

Moreover, a conventional 1-control-transistor-1-sortage-capacitor (1T1C) one-time programmable memory requires a high voltage (e.g., 4-5V) to break down the oxide layer in the capacitor. Similarly, a conventional 1-control-transistor-1-storage-transistor (1T1T) one-time programmable memory also requires the high voltage (e.g., 4-5V) to breakdown the gate oxide layer of the storage transistor. The aforementioned high voltage far exceeds the working voltage of the transistor. Therefore, 1T1C or 1T1T one-time programmable memory requires additional peripheral circuits to generate the high voltage. However, the peripheral circuits capable of generating the higher voltage need larger areas.

SUMMARY

In one or more various aspects, the present disclosure is directed to a one-time programmable memory circuit, a one-time programmable memory and an operating method thereof.

One embodiment of the present disclosure is related to a one-time programmable (OTP) memory, which includes an OTP diode and a control field effect transistor (FET). The OTP diode has one end electrically connected to a source line. The control field effect transistor (FET) includes a gate, a first source/drain and a second source/drain, where the gate of the control FET is electrically connected to a word line, and the first source/drain of the control FET is electrically connected to a bit line, and the second source/drain of the control FET is electrically connected to another end of the OTP diode.

In one embodiment of the present disclosure, the control FET is an N-type control FET, and the OTP diode consists of an NPN transistor, the NPN transistor includes a first N-type semiconductor, a P-type semiconductor and a second N-type semiconductor, the P-type semiconductor is disposed between the first N-type semiconductor and the second N-type semiconductor, the first N-type semiconductor is electrically connected to the source line, and the second N-type semiconductor is electrically connected to the second source/drain of the control FET.

In one embodiment of the present disclosure, the control FET is an N-type control FET, and the OTP diode consists of a NIN transistor, the NIN transistor includes a first N-type semiconductor, an intrinsic (I-type) semiconductor and a second N-type semiconductor, the I-type semiconductor is disposed between the first N-type semiconductor and the second N-type semiconductor, the first N-type semiconductor is electrically connected to the source line, and the second N-type semiconductor is electrically connected to the second source/drain of the control FET.

In one embodiment of the present disclosure, the control FET is a P-type control FET, and the OTP diode consists of a PNP transistor, the PNP transistor includes a first P-type semiconductor, an N-type semiconductor and a second P-type semiconductor, the N-type semiconductor is disposed between the first P-type semiconductor and the second P-type semiconductor, the first P-type semiconductor is electrically connected to the source line, and the second P-type semiconductor is electrically connected to the second source/drain of the control FET.

In one embodiment of the present disclosure, the control FET is a P-type control FET, and the OTP diode consists of a PIP transistor, the PIP transistor includes a first P-type semiconductor, an intrinsic (I-type) semiconductor and a second P-type semiconductor, the I-type semiconductor is disposed between the first P-type semiconductor and the second P-type semiconductor, the first P-type semiconductor is electrically connected to the source line, and the second P-type semiconductor is electrically connected to the second source/drain of the control FET.

In one embodiment of the present disclosure, the control FET is an N-type control FET, the OTP diode consists of a gate-floating N-type FET, and two N-type sources/drains of the gate-floating N-type FET are electrically connected to the second source/drain of the control FET and the source line respectively.

In one embodiment of the present disclosure, the control FET is a P-type control FET, the OTP diode consists of a gate-floating P-type FET, and two P-type sources/drains of the gate-floating P-type FET are electrically connected to the second source/drain of the control FET and the source line respectively.

In one embodiment of the present disclosure, when the control FET is turned on by a control voltage of the word line, a programming voltage of the bit line makes an avalanche breakdown occur in the OTP diode, thereby forming a programmed state of the OTP diode.

Another embodiment of the present disclosure is related to a memory circuit, which includes a plurality of memory units arranged in an array, each of the memory units includes a one-time programmable memory, and the one-time programmable memory includes an OTP diode and a control FET. The OTP diode has one end electrically connected to a source line. The control FET includes a gate, a first source/drain and a second source/drain, where the gate of the control FET is electrically connected to a word line, and the first source/drain of the control FET is electrically connected to a bit line, and the second source/drain of the control FET is electrically connected to another end of the OTP diode.

In one embodiment of the present disclosure, each of the memory units further comprises another one-time programmable memory, and the another one-time programmable memory includes another OTP diode and another control FET. Said another OTP diode has one end electrically connected to a source line. The another control FET includes a gate, a first source/drain and a second source/drain, where the gate of the another control FET is electrically connected to another word line, the first source/drain of the another control FET is electrically connected to the bit line, and the second source/drain of the another control FET is electrically connected to another end of the another OTP diode.

Another embodiment of the present disclosure is related to an operation method of a one-time programmable memory, and the one-time programmable memory includes an OTP diode and a control FET connected in series. The operation method includes steps of: when programming the one-time programmable memory, applying a control voltage to a word line, applying a programming voltage to a bit line, and applying a zero voltage to a source line, wherein one end of the OTP diode is electrically connected to the source line, a gate of the control FET is electrically connected to the word line, a first source/drain of the control FET is electrically connected to the bit line, a second source/drain of the control FET is electrically connected to another end of the OTP diode.

In one embodiment of the present disclosure, the control voltage turns on the control FET, the programming voltage makes an avalanche breakdown occur in the OTP diode, thereby forming a programmed state of the OTP diode.

In one embodiment of the present disclosure, the operation method further includes steps of: when reading the one-time programmable memory, applying a working voltage to the word line, applying the zero voltage to the source line, and applying a read voltage to the bit line.

In one embodiment of the present disclosure, the control FET is an N-type control FET or a P-type control FET.

Technical advantages are generally achieved, by embodiments of the present disclosure. The one-time programmable memory of the present disclosure is a 1-transistor-1-diode (1T1D) one-time programmable memory, which requires a low programming voltage. Therefore, the one-time programmable memory of the present disclosure has a high stability, and the area of its peripheral circuit is relatively small.

Many of the attendant features will be more readily appreciated, as the same becomes better understood by reference to the following detailed description considered in connection with the accompanying drawings.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
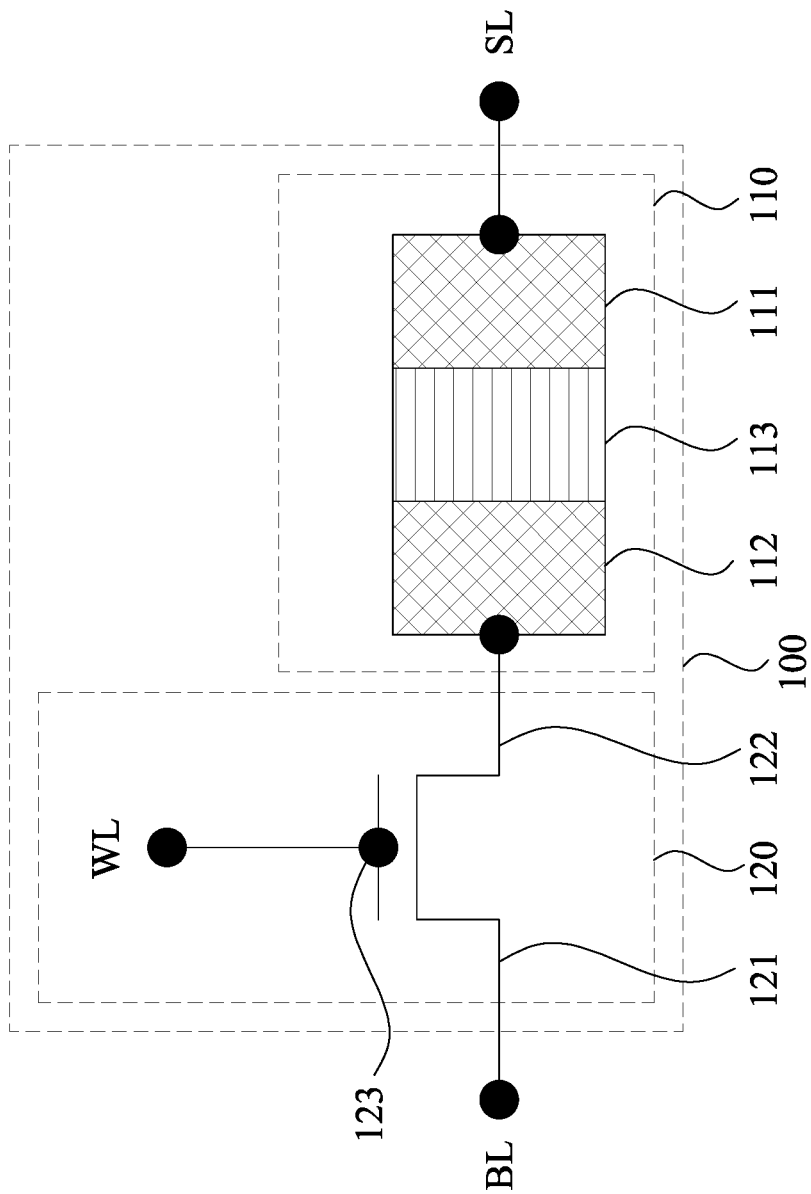
FIG. 1 is a circuit diagram of a one-time programmable memory according to some embodiments of the present disclosure.

Reference will now be made in detail to the present embodiments of the invention, examples of which are illustrated in the accompanying drawings. Wherever possible, the same reference numbers are used in the drawings and the description to refer to the same or like parts.

Referring to FIG. 1, in one aspect, the present disclosure is directed to one-time programmable memories 100, 200, 300 and 400. These one-time programmable memories may be easily integrated into the one-time programmable memory circuits and may be applicable or readily adaptable to all technologies. Accordingly, the one-time programmable memory 100 has advantages. Herewith the one-time programmable memories 100, 200, 300 and 400 are described below with FIGS. 1-4.

The subject disclosure provides the memories 100, 200, 300 and 400 in accordance with the subject technology. Various aspects of the present technology are described with reference to the drawings. In the following description, for purposes of explanation, numerous specific details are set forth in order to provide a thorough understanding of one or more aspects. It can be evident, however, that the present technology can be practiced without these specific details. In other instances, well-known structures and devices are shown in block diagram form in order to facilitate describing these aspects. The word "exemplary" is used herein to mean "serving as an example, instance, or illustration." Any embodiment described herein as "exemplary" is not necessarily to be construed as preferred or advantageous over other embodiments.

FIG. 1 is a circuit diagram of a one-time programmable memory 100 according to some embodiments of the present disclosure. As shown in FIG. 1, the one-time programmable memory 100 includes an OTP diode 110 and a control FET 120 connected in series. In structure, one end of the OTP diode 110 is electrically connected to a source line SL. The control FET 120 includes a gate 123, a first source/drain 121 and a second source/drain 122, where the gate 123 of the control FET 120 is electrically connected to a word line WL, and the first source/drain 121 of the control FET 120 is electrically connected to a bit line BL, and the second source/drain 122 of the control FET 120 is electrically connected to another end of the OTP diode 110.

Moreover, it should be noted that in the embodiments and the scope of the present disclosure, the description related to "electrical connection" can generally refer to one component being indirectly electrically coupled to another component through intervening components, or a component is directly electrically connected to another component, there are no intervening components present.

In FIG. 1, the control FET 120 is an N-type control FET. Regarding the architecture of the OTP diode 110, in some embodiments of the present disclosure, the OTP diode 110 consists of an NPN transistor, the NPN transistor includes a first N-type semiconductor 111, a semiconductor 113 (e.g., a P-type semiconductor) and a second N-type semiconductor 112. The semiconductor 113 (e.g., the P-type semiconductor) is disposed between the first N-type semiconductor 111 and the second N-type semiconductor 112, the first N-type semiconductor 111 is electrically connected to the source line SL, and the second N-type semiconductor 112 is electrically connected to the second source/drain 122 of the control FET 120.

Alternatively, in some embodiments of the present disclosure, the OTP diode 110 consists of an NIN transistor, the NIN transistor includes a first N-type semiconductor 111, a semiconductor 113 (e.g., an intrinsic (I-type) semiconductor) and a second N-type semiconductor 112. The semiconductor 113 (e.g., the I-type semiconductor) is disposed between the first N-type semiconductor 111 and the second N-type semiconductor 112, the first N-type semiconductor 111 is electrically connected to the source line SL, and the second N-type semiconductor 112 is electrically connected to the second source/drain 122 of the control FET 120.

Figure 2:
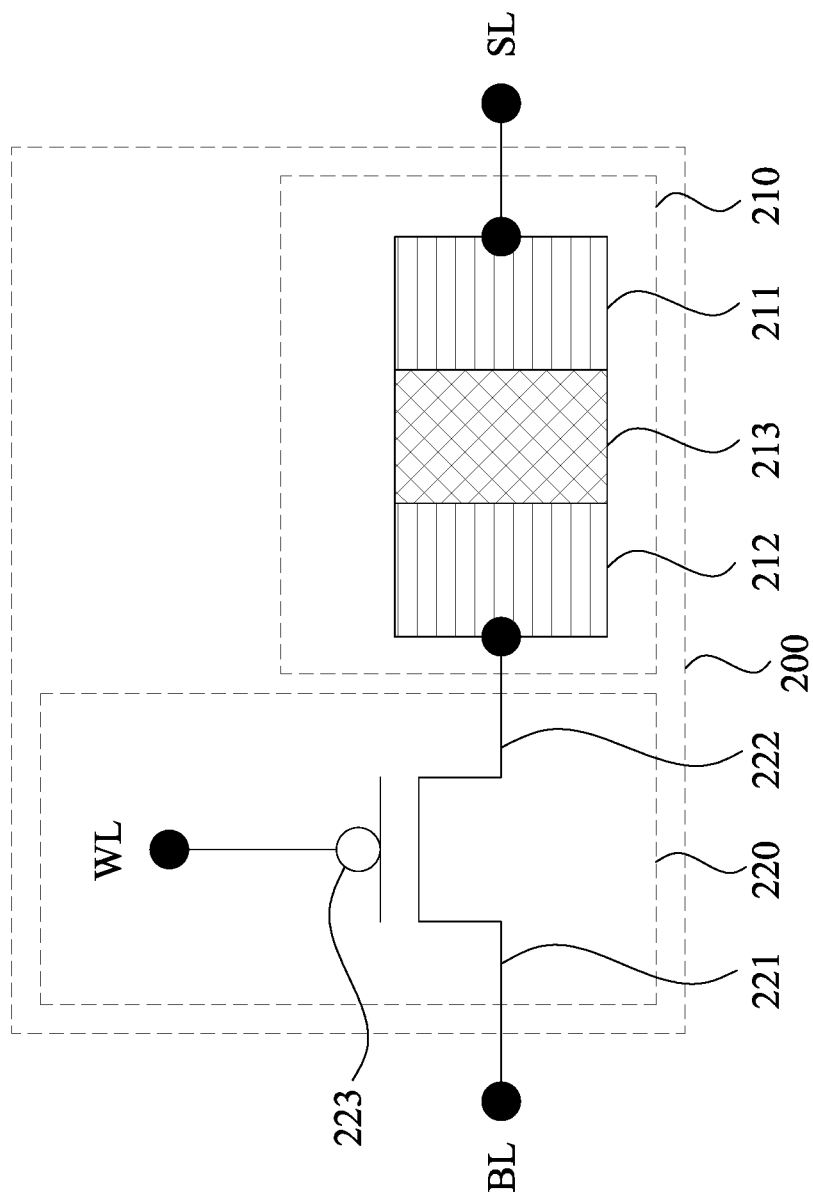
FIG. 2 is a circuit diagram of a one-time programmable memory according to some embodiments of the present disclosure.

FIG. 2 is a circuit diagram of a one-time programmable memory 200 according to some embodiments of the present disclosure. As shown in FIG. 2, the one-time programmable memory 200 includes an OTP diode 210 and a control FET 220 connected in series. In structure, one end of the OTP diode 210 is electrically connected to a source line SL. The control FET 220 includes a gate 223, a first source/drain 221 and a second source/drain 222, where the gate 223 of the control FET 220 is electrically connected to a word line WL, and the first source/drain 221 of the control FET 220 is electrically connected to a bit line BL, and the second source/drain 222 of the control FET 220 is electrically connected to another end of the OTP diode 210.

In FIG. 2, the control FET 220 is a P-type control FET. Regarding the architecture of the OTP diode 210, in some embodiments of the present disclosure, the OTP diode 210 consists of an PNP transistor, the PNP transistor includes a first P-type semiconductor 211, a semiconductor 213 (e.g., a N-type semiconductor) and a second P-type semiconductor 212. The semiconductor 213 (e.g., the N-type semiconductor) is disposed between the first P-type semiconductor 211 and the second P-type semiconductor 212, the first P-type semiconductor 211 is electrically connected to the source line SL, and the second P-type semiconductor 212 is electrically connected to the second source/drain 222 of the control FET 220.

Alternatively, in some embodiments of the present disclosure, the OTP diode 210 consists of an PIP transistor, the PIP transistor includes a first P-type semiconductor 211, a semiconductor 213 (e.g., an intrinsic (I-type) semiconductor) and a second P-type semiconductor 212. The semiconductor 213 (e.g., the I-type semiconductor) is disposed between the first P-type semiconductor 211 and the second P-type semiconductor 212, the first P-type semiconductor 211 is electrically connected to the source line SL, and the second P-type semiconductor 212 is electrically connected to the second source/drain 222 of the control FET 220.

Figure 3:
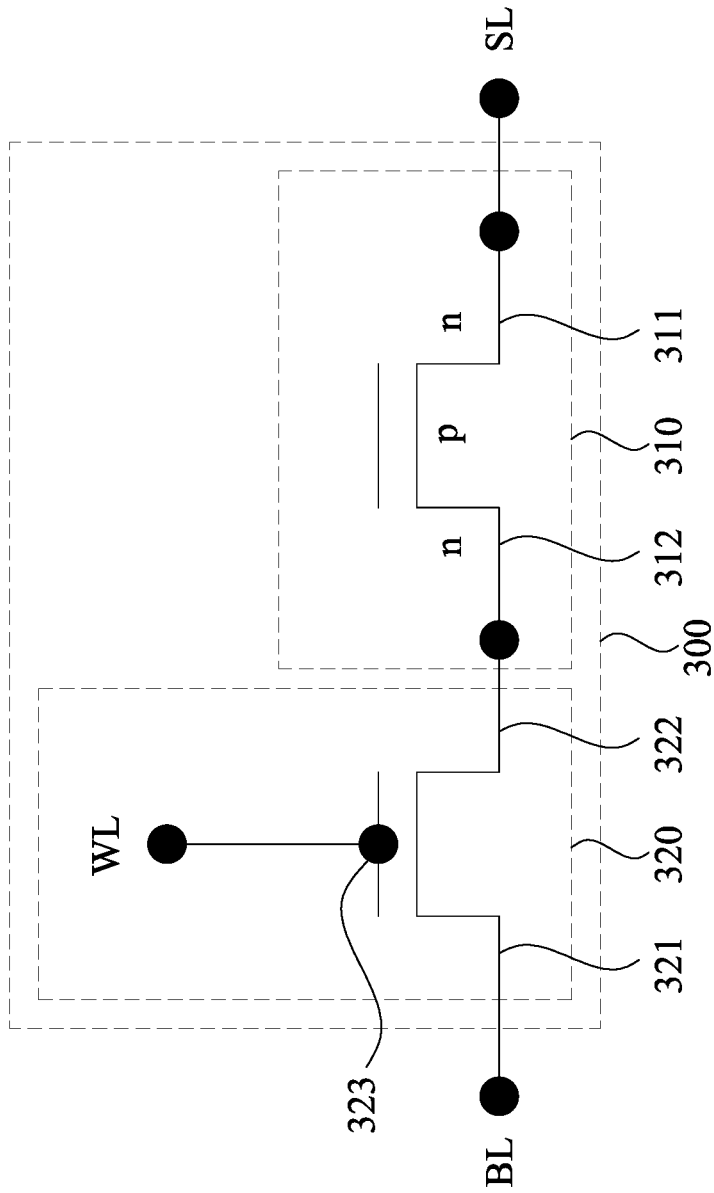
FIG. 3 is a circuit diagram of a one-time programmable memory according to some embodiments of the present disclosure.

FIG. 3 is a circuit diagram of a one-time programmable memory 300 according to some embodiments of the present disclosure. As shown in FIG. 3, the one-time programmable memory 300 includes an OTP diode 310 and a control FET 320 connected in series. In structure, one end of the OTP diode 310 is electrically connected to a source line SL. The control FET 320 includes a gate 323, a first source/drain 321 and a second source/drain 322, where the gate 323 of the control FET 320 is electrically connected to a word line WL, and the first source/drain 321 of the control FET 320 is electrically connected to a bit line BL, and the second source/drain 322 of the control FET 320 is electrically connected to another end of the OTP diode 310.

In FIG. 3, the control FET 320 is an N-type control FET. Regarding the architecture of the OTP diode 310, in some embodiments of the present disclosure, the OTP diode 310 consists of a gate-floating N-type FET, and two N-type sources/drains 312 and 311 of the gate-floating N-type FET are electrically connected to the second source/drain 322 of the control FET 320 and the source line SL respectively. In FIG. 3, there is a P-type semiconductor region p (e.g., a P-type lightly doped region) between the N-type source/drain 312 (e.g., a drain) and N-type source/drain 311 (e.g., a source), where the N-type source/drain 312 and the N-type source/drain 311 both are N-type semiconductor regions n (e.g., N-type heavily doped regions).

Figure 4:
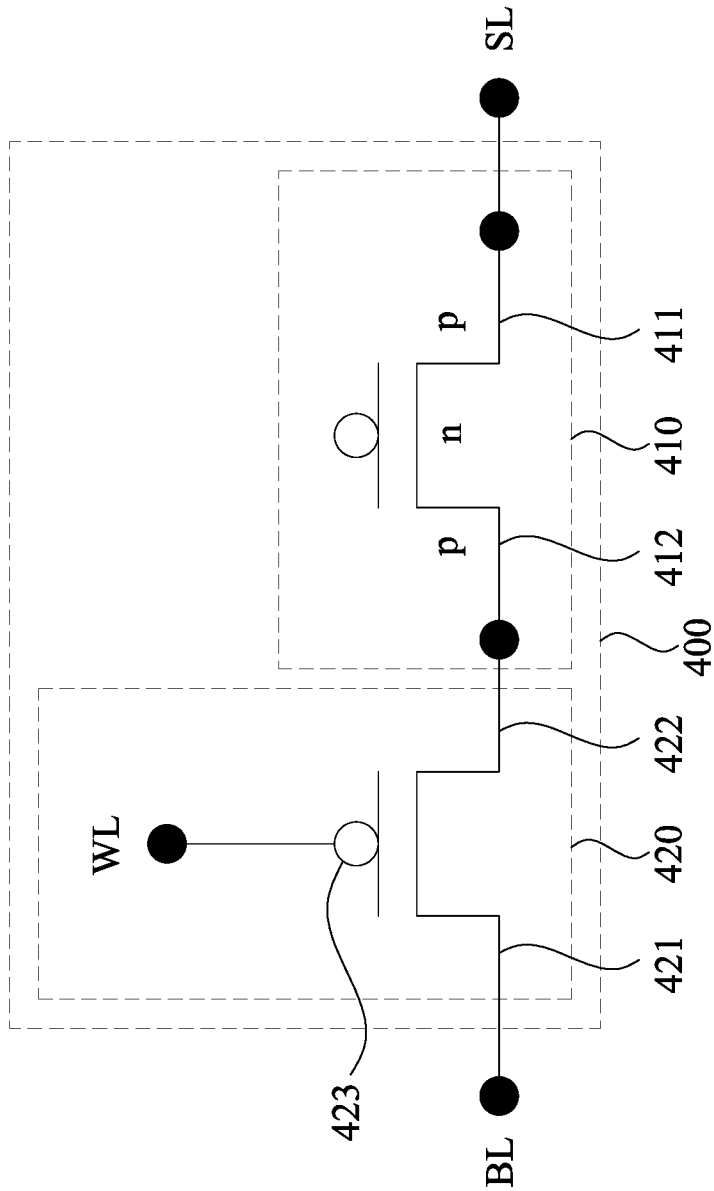
FIG. 4 is a circuit diagram of a one-time programmable memory according to some embodiments of the present disclosure.

FIG. 4 is a circuit diagram of a one-time programmable memory 400 according to some embodiments of the present disclosure. As shown in FIG. 4, the one-time programmable memory 400 includes an OTP diode 410 and a control FET 420 connected in series. In structure, one end of the OTP diode 410 is electrically connected to a source line SL. The control FET 420 includes a gate 423, a first source/drain 421 and a second source/drain 422, where the gate 423 of the control FET 420 is electrically connected to a word line WL, and the first source/drain 421 of the control FET 420 is electrically connected to a bit line BL, and the second source/drain 422 of the control FET 420 is electrically connected to another end of the OTP diode 410.

In FIG. 4, the control FET 420 is a P-type control FET. Regarding the architecture of the OTP diode 410, in some embodiments of the present disclosure, the OTP diode 410 consists of a gate-floating P-type FET, and two P-type sources/drains 412 and 411 of the gate-floating P-type FET are electrically connected to the second source/drain 422 of the control FET 420 and the source line SL respectively. In practice, for example, there is a N-type semiconductor region n (e.g., a N-type lightly doped region) between the P-type source/drain 412 (e.g., a source) and P-type source/drain 411 (e.g., a drain), where the P-type source/drain 412 and the P-type source/drain 411 both are P-type semiconductor regions p (e.g., P-type heavily doped regions).

Figure 5:
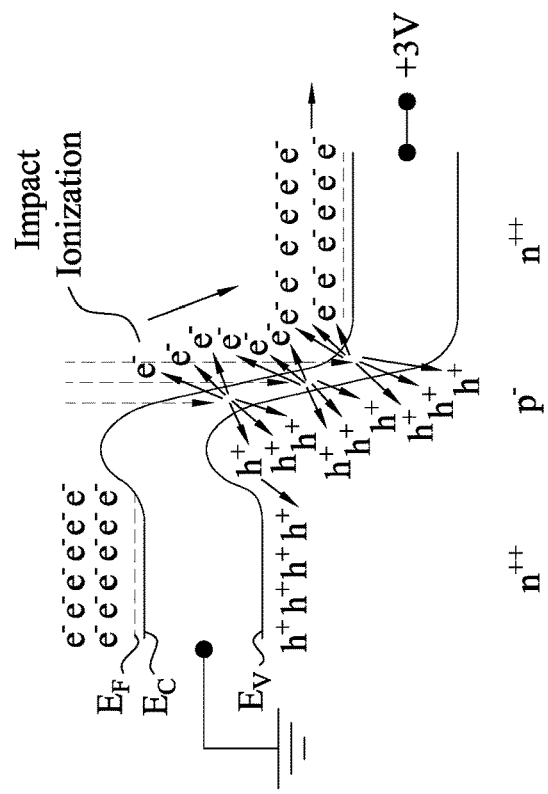
FIG. 5 is a band-gap diagram of an operation method of a one-time programmable memory according to some embodiments of the present disclosure.
Figure 5:
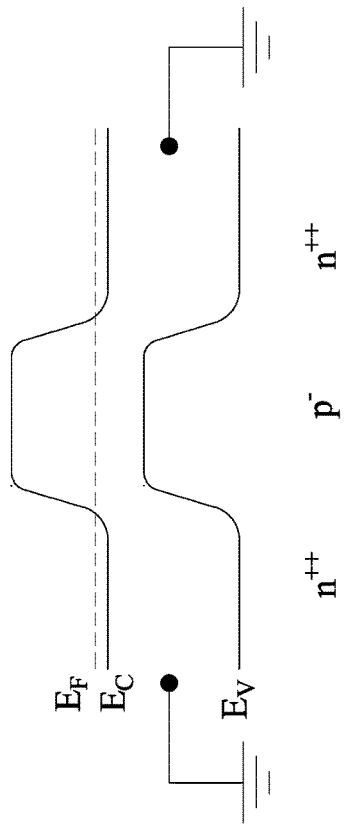

Regarding the operation methods of the one-time programmable memories 100, 200, 300 and 400, refer to FIG. 1 to FIG. 5. FIG. 5 is a band-gap diagram of an operation method of a one-time programmable memory according to some embodiments of the present disclosure. In practice, for example, two N-type heavily doped regions $n^{++}$ in FIG. 5 can respectively represent the first N-type semiconductor 111 and the second N-type semiconductor 112 in FIG. 1, and the P-type lightly doped region $p^-$ in FIG. 5 can represent the semiconductor 113 (e.g., the P-type semiconductor) in FIG. 1; alternatively, the two N-type heavily doped regions $n^{++}$ in FIG. 5 can respectively represent the N-type source/drain 312 and the N-type source/drain 311 in FIG. 3, and the P-type lightly doped region p in FIG. 5 can represent a P-type semiconductor substrate between the N-type sources/drain 312 and the N-type sources/drain 311. It should be understood that the operation methods of one-time programmable memories 100, 200, 300 and 400 are essentially the same. To simplify the explanation below, one-time programmable memory 300 is used as an example.

In the initial stage 501, the one-time programmable memory 300 is not selected, and the zero voltage is applied to word line WL, the bit line BL and the source line SL. At this time, the conduction band $E_C$, the Fermi level $E_F$ and the valence band $E_V$ are all stable, and the control FET 320 is kept in the cut-off state, thereby effectively preventing the leakage current.

In the programming stage 502, when the one-time programmable memory 100 is programed, a control voltage (e.g., about 0.9-1.1 V) is applied to the word line WL, a programming voltage (e.g., about 3 V) is applied to the bit line BL, and a zero voltage is applied to the source line SL. The control voltage turns on the control FET 320. When the control FET 320 is turned on by the control voltage of the word line WL, the programming voltage of the bit line BL makes an avalanche breakdown occur in the OTP diode 310, thereby forming a programmed state of the OTP diode 310.

Specifically, when a large drain-to-source voltage is across the OTP diode 310 (i.e., NPN diode), the energy-band near the drain is pulled down, and the channel-drain PN junction is reversed such that its depletion-region expands to channel, and therefore built-in electric field hugely increases. In a strong built-in electric field, transporting electrons are accelerated, and kinetic energy increases. These high-energy electrons hence hit junction lattice to knock out inner-shield electrons from atoms at lattice-sites. As a result, electron-hole pairs (EHPs) are generated, in which each EHP includes a pair of an electron e and a hole $h^+$. Electrons e of the EHPs receive energy transferred from accelerated electrons, which triggers chain effect such that avalanche breakdown happens. Channel-drain junction will be destructed by an avalanche process, and the OTP diode 310 cannot rectify current, resulting in an effective open circuit. Finally, the programmed state of the OTP diode 310 is formed.

In some embodiments of the present disclosure, the programming voltage is approximately less than 4V, and the programming voltage is approximately greater than or equal to 2V. Therefore, the 1T1D architecture of the present disclosure (e.g., one-time programmable memories 100, 200, 300 and 400) requires a low programming voltage. Therefore, the one-time programmable memory of the present disclosure has a high stability, and the area of its peripheral circuit is relatively small.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

In some embodiments of the present disclosure, when the one-time programmable memory 300 is read, a working voltage is applied to word line WL, the zero voltage is applied to the source line SL, a read voltage is applied to the bit line BL and the read current is sensed through bit line BL. In practice, for example, the working voltage is the power voltage of the drain of the control FET 320, and the above control voltage is about 1-1.2 times the working voltage.

In some embodiments of the present disclosure, the polarity of the read voltage is opposite to the polarity of the programming voltage, thereby stably operating the one-time programming/reading of the one-time programmable memory 300.

Figure 6:
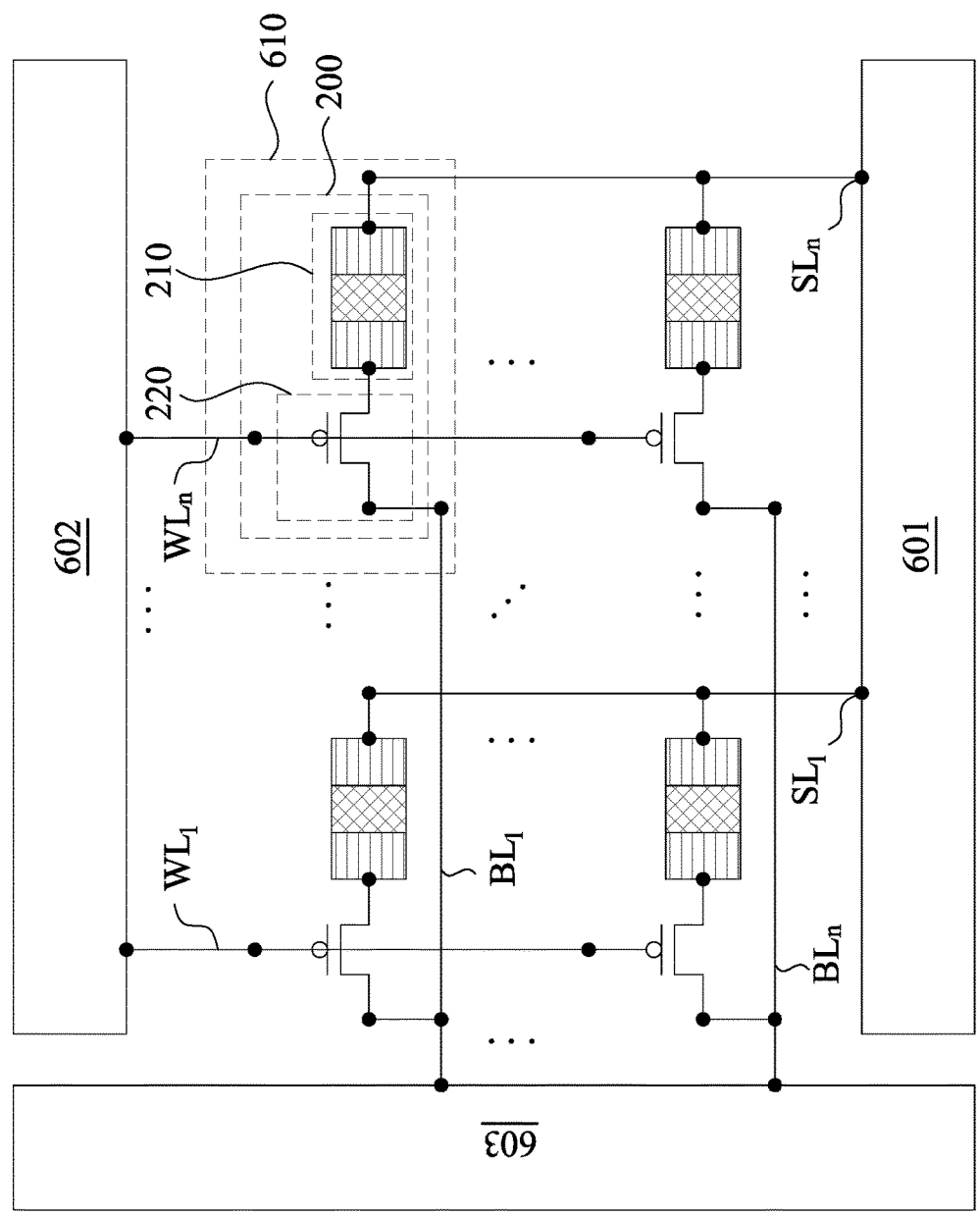
FIG. 6 is a circuit diagram of a one-time programmable memory circuit according to some embodiments of the present disclosure.

For a more complete understanding of an array composed of the one-time programmable memories 200, refer to FIG. 2 and FIG. 6. FIG. 6 is a circuit diagram of a one-time programmable memory circuit 600 according to some embodiments of the present disclosure. As shown in FIG. 6, the one-time programmable memory circuit 600 includes a plurality of memory units 610 arranged in an array, and each memory unit 610 has the same structure.

Taking the corner memory unit 610 as an example, it may include one-time programmable memory 200. The one-time programmable memory 200 includes an OTP diode 210 and a control FET 220. One end of the OTP diode 210 is electrically connected to a source line $SL_n$. The gate of the control FET 220 is electrically connected to a word line $WL_n$, the first source/drain of the control FET 220 is electrically connected to a bit line $BL_1$, and the second source/drain of the control FET 220 is electrically connected to another end of the OTP diode 210.

In FIG. 6, the source lines $SL_1$-$SL_n$ are electrically connected to the circuit 601, word lines $WL_1$-$WL_n$ are electrically connected to the circuit 602, and bit lines $BL_1$~$BL_n$ are electrically connected to the circuit 603. In some embodiments of the disclosure, the circuit 601 can include a source line driver and a controller, the circuit 602 can include a word line driver and a controller, and the circuit 603 can include a bit line driver, a controller and a sense amplifier. In practice, for example, the sense amplifier in the circuit 603 can sense the read current through bit line $BL_1$.

Figure 7:
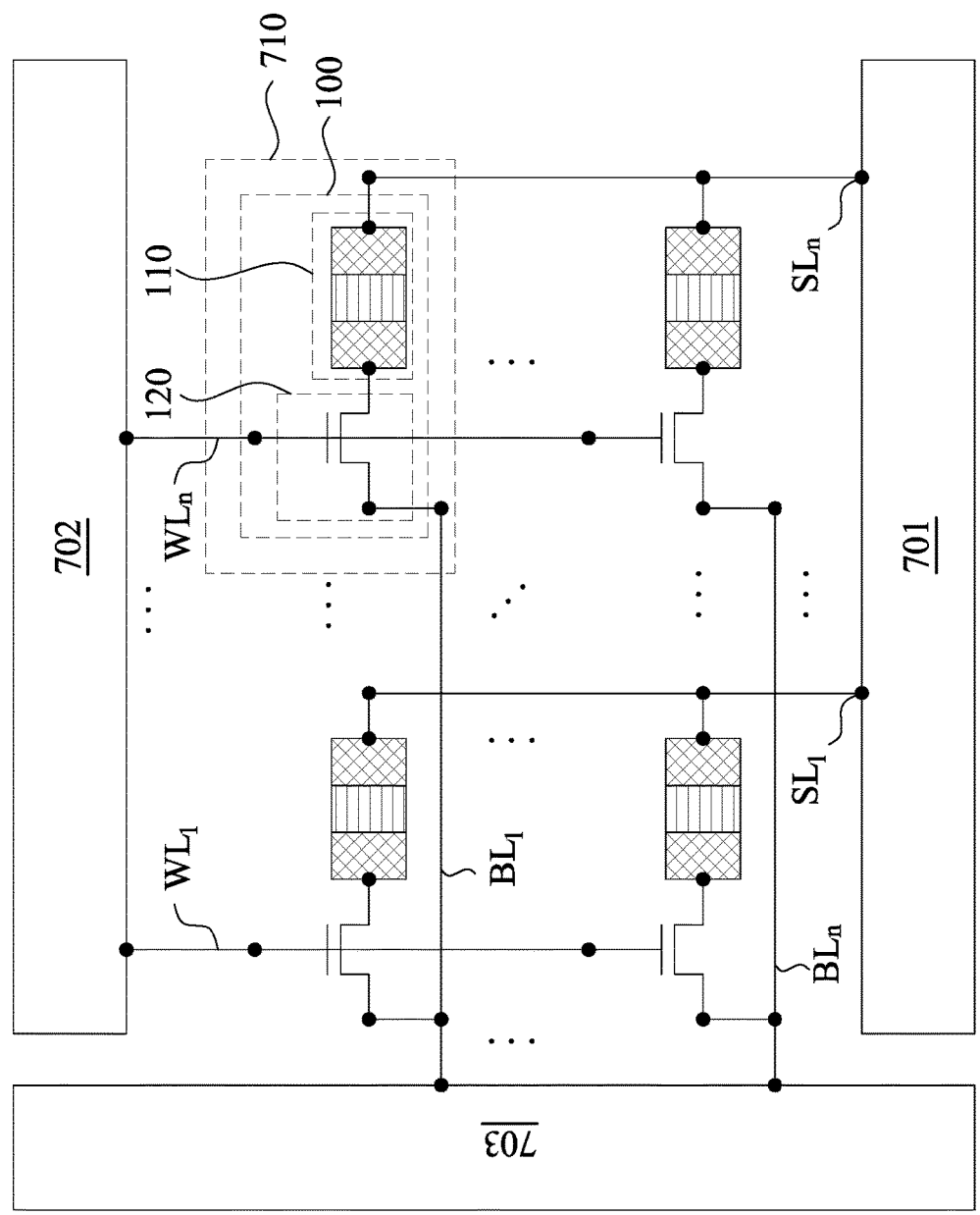
FIG. 7 is a circuit diagram of a one-time programmable memory circuit according to some embodiments of the present disclosure.

For a more complete understanding of an array composed of the one-time programmable memories 100, refer to FIG. 1 and FIG. 7. FIG. 7 is a circuit diagram of a one-time programmable memory circuit 700 according to some embodiments of the present disclosure. As shown in FIG. 7, the one-time programmable memory circuit 700 includes a plurality of memory units 710 arranged in an array, and each memory unit 710 has the same structure.

Taking the corner memory unit 710 as an example, it may include a one-time programmable memory 100. The one-time programmable memory 100 includes an OTP diode 110 and a control FET 120. One end of the OTP diode 110 is electrically connected to a source line $SL_n$. The gate of the control FET 120 is electrically connected to a word line $WL_n$, the first source/drain of the control FET 120 is electrically connected to a bit line $BL_1$, and the second source/drain of the control FET 120 is electrically connected to another end of the OTP diode 110.

In FIG. 7, the source lines $SL_1$-$SL_n$ are electrically connected to the circuit 701, word lines $WL_1$-$WL_n$ are electrically connected to the circuit 702, and bit lines $BL_1$~$BL_n$ are electrically connected to the circuit 703. In some embodiments of the disclosure, the circuit 701 can include a source line driver and a controller, the circuit 702 can include a word line driver and a controller, and the circuit 703 can include a bit line driver, a controller and a sense amplifier. In practice, for example, the sense amplifier in the circuit 703 can sense the read current through bit line $BL_1$.

Figure 8:
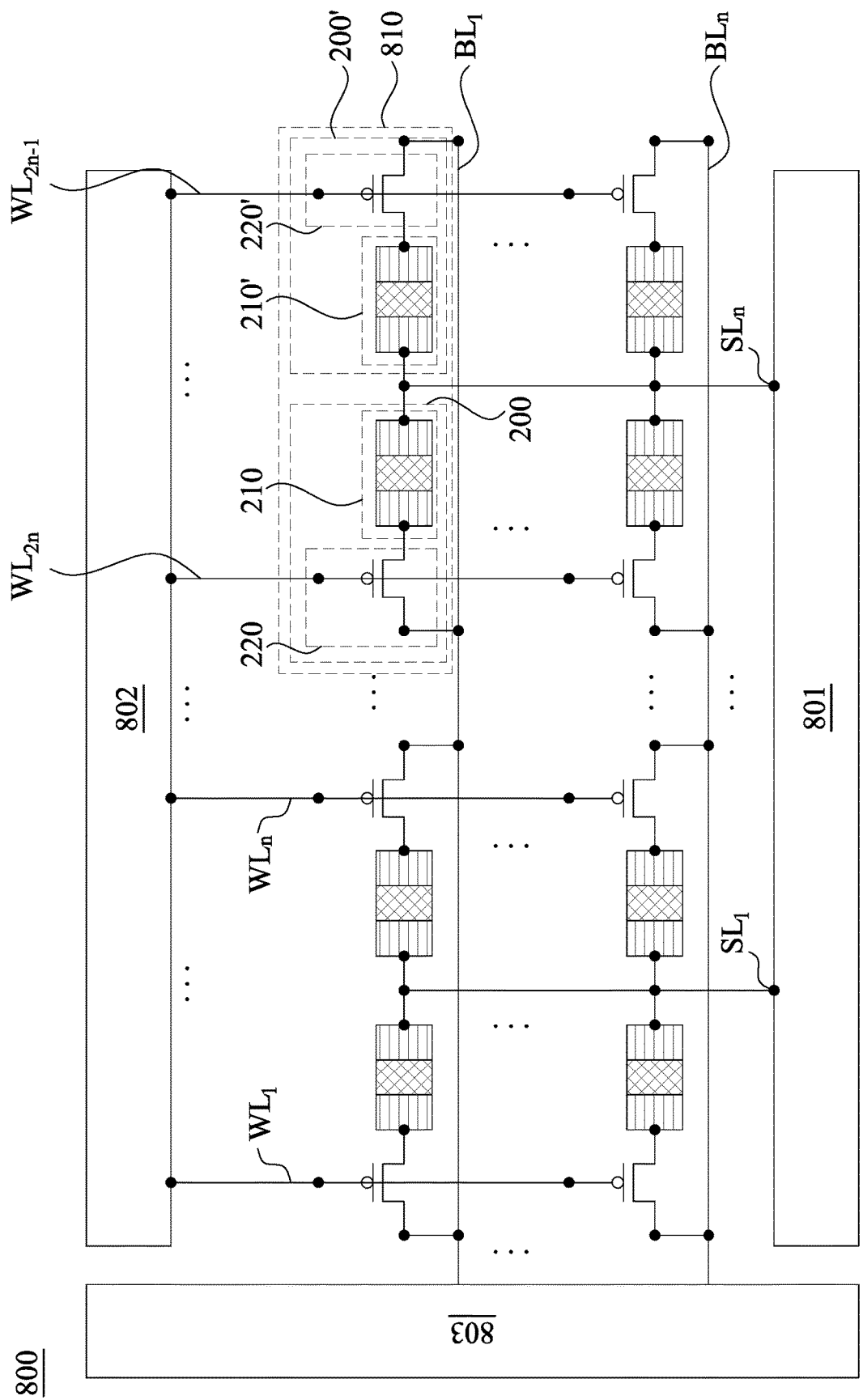
FIG. 8 is a circuit diagram of a one-time programmable memory circuit according to some embodiments of the present disclosure.

For a more complete understanding of another array composed of the one-time programmable memories 200, refer to FIG. 2 and FIG. 8. FIG. 8 is a circuit diagram of a one-time programmable memory circuit 800 according to some embodiments of the present disclosure. As shown in FIG. 8, the one-time programmable memory circuit 800 includes a plurality of memory units 810 arranged in an array, and each memory unit 810 has the same structure.

Taking the corner memory unit 810 as an example, it may include a one-time programmable memory 200 and a one-time programmable memory 200'. In practice, for example, the internal structure of the one-time programmable memory 200 is substantially the same as the internal structure of the one-time programmable memory 200', and the one-time programmable memory 200 and the one-time programmable memory 200' are symmetrical to each other along the source line $SL_n$.

The one-time programmable memory 200 includes an OTP diode 210 and a control FET 220. One end of the OTP diode 210 is electrically connected to a source line $SL_n$. The gate of the control FET 220 is electrically connected to a word line $WL_{2n}$, the first source/drain of the control FET 220 is electrically connected to a bit line $BL_1$, and the second source/drain of the control FET 220 is electrically connected to another end of the OTP diode 210.

The one-time programmable memory 200' includes an OTP diode 210' and a control FET 220'. One end of the OTP diode 210' is electrically connected to a source line $SL_n$. The gate of the control FET 220' is electrically connected to a word line $WL_{2n-1}$, the first source/drain of the control FET 220' is electrically connected to a bit line $BL_1$, and the second source/drain of the control FET 220' is electrically connected to another end of the OTP diode 210'.

In FIG. 8, the source lines $SL_1$-$SL_n$ are electrically connected to the circuit 801, word lines $WL_1$-$WL_{2n}$ are electrically connected to the circuit 802, and bit lines $BL_1$~$BL_n$ are electrically connected to the circuit 803. In some embodiments of the disclosure, the circuit 801 can include a source line driver and a controller, the circuit 802 can include a word line driver and a controller, and the circuit 803 can include a bit line driver, a controller and a sense amplifier. In practice, for example, the sense amplifier in the circuit 803 can sense the read current through bit line $BL_1$.

Figure 9:
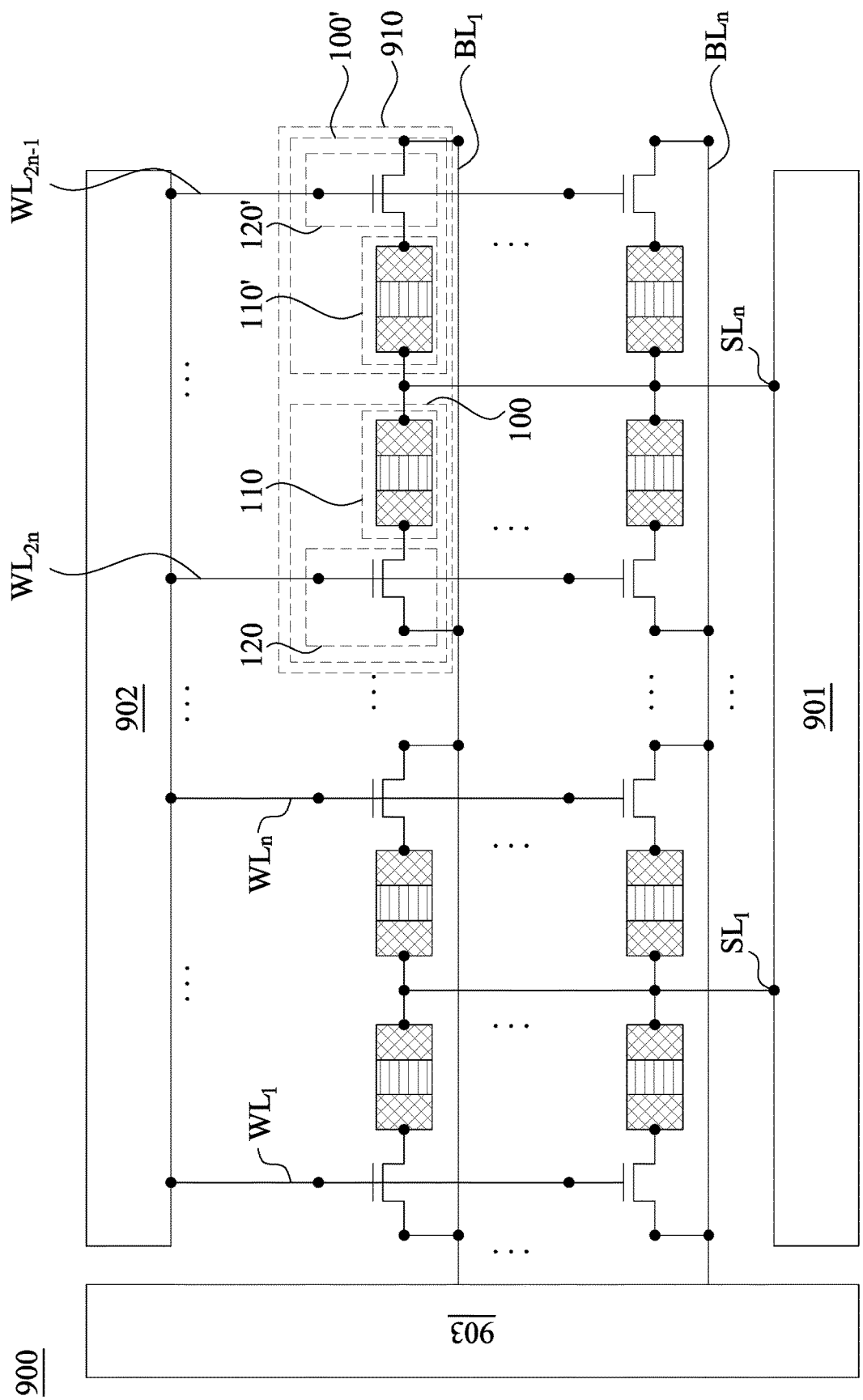
FIG. 9 is a circuit diagram of a one-time programmable memory circuit according to some embodiments of the present disclosure.

For a more complete understanding of another array composed of the one-time programmable memories 100, refer to FIG. 1 and FIG. 9. FIG. 9 is a circuit diagram of a one-time programmable memory circuit 900 according to some embodiments of the present disclosure. As shown in FIG. 9, the one-time programmable memory circuit 900 includes a plurality of memory units 910 arranged in an array, and each memory unit 910 has the same structure.

Taking the corner memory unit 910 as an example, it may include a one-time programmable memory 100 and a one-time programmable memory 100'. In practice, for example, the internal structure of the one-time programmable memory 100 is substantially the same as the internal structure of the one-time programmable memory 100', and the one-time programmable memory 100 and the one-time programmable memory 100' are symmetrical to each other along the source line $SL_n$.

The one-time programmable memory 100 includes an OTP diode 110 and a control FET 120. One end of the OTP diode 110 is electrically connected to a source line $SL_n$. The gate of the control FET 120 is electrically connected to a word line $WL_{2n}$, the first source/drain of the control FET 120 is electrically connected to a bit line $BL_1$, and the second source/drain of the control FET 120 is electrically connected to another end of the OTP diode 110.

The one-time programmable memory 100' includes an OTP diode 110' and a control FET 120'. One end of the OTP diode 110' is electrically connected to a source line $SL_n$. The gate of the control FET 120' is electrically connected to a word line $WL_{2n-1}$, the first source/drain of the control FET 120' is electrically connected to a bit line $BL_1$, and the second source/drain of the control FET 120' is electrically connected to another end of the OTP diode 110'.

In FIG. 9, the source lines $SL_1$-$SL_n$ are electrically connected to the circuit 901, word lines $WL_1$-$WL_{2n}$ are electrically connected to the circuit 902, and bit lines $BL_1$~$BL_n$ are electrically connected to the circuit 903. In some embodiments of the disclosure, the circuit 901 can include a source line driver and a controller, the circuit 902 can include a word line driver and a controller, and the circuit 903 can include a bit line driver, a controller and a sense amplifier. In practice, for example, the sense amplifier in the circuit 903 can sense the read current through bit line $BL_1$.

Figure 10:
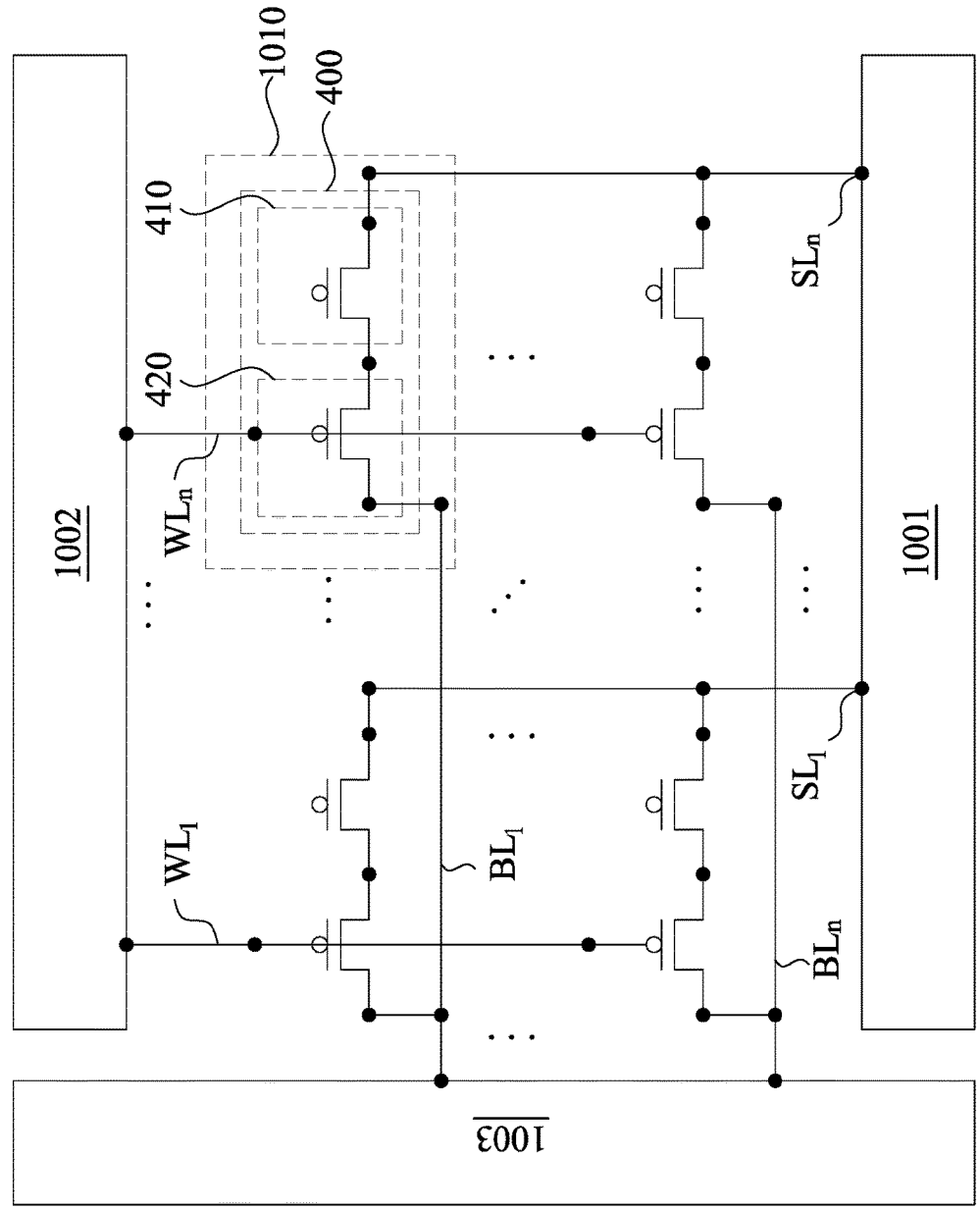
FIG. 10 is a circuit diagram of a one-time programmable memory circuit according to some embodiments of the present disclosure.

For a more complete understanding of an array composed of the one-time programmable memories 400, refer to FIG. 4 and FIG. 10. FIG. 10 is a circuit diagram of a one-time programmable memory circuit 1000 according to some embodiments of the present disclosure. As shown in FIG. 10, the one-time programmable memory circuit 1000 includes a plurality of memory units 1010 arranged in an array, and each memory unit 1010 has the same structure.

Taking the corner memory unit 1010 as an example, it may include a one-time programmable memory 400. The one-time programmable memory 400 includes an OTP diode 410 and a control FET 420. One end of the OTP diode 410 is electrically connected to a source line $SL_n$. The gate of the control FET 420 is electrically connected to a word line $WL_n$, the first source/drain of the control FET 420 is electrically connected to a bit line $BL_1$, and the second source/drain of the control FET 420 is electrically connected to another end of the OTP diode 410.

In FIG. 10, the source lines $SL_1$-$SL_n$ are electrically connected to the circuit 1001, word lines $WL_1$-$WL_n$ are electrically connected to the circuit 1002, and bit lines $BL_1$~$BL_n$ are electrically connected to the circuit 1003. In some embodiments of the disclosure, the circuit 1001 can include a source line driver and a controller, the circuit 1002 can include a word line driver and a controller, and the circuit 1003 can include a bit line driver, a controller and a sense amplifier. In practice, for example, the sense amplifier in the circuit 1003 can sense the read current through bit line $BL_1$.

Figure 11:
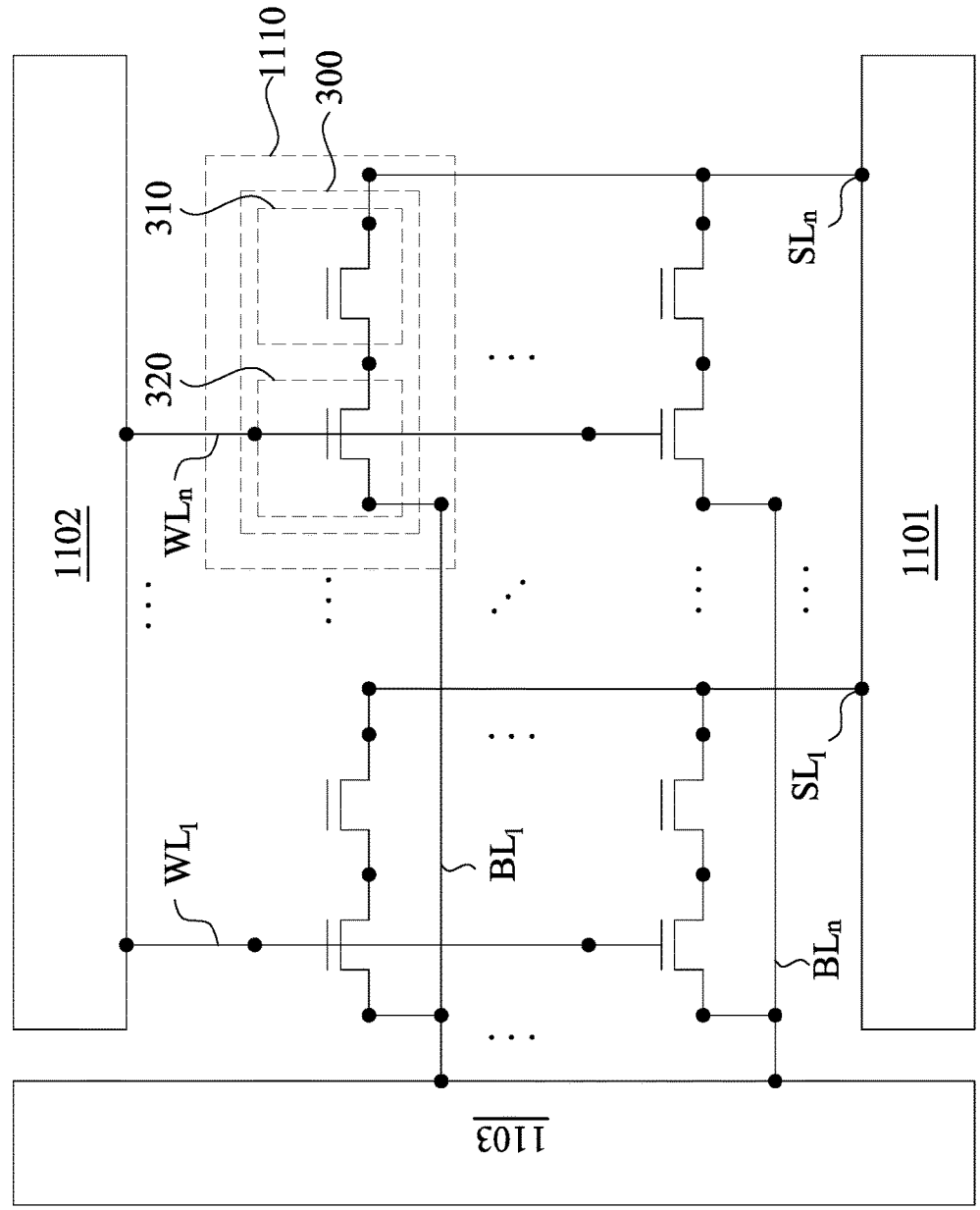
FIG. 11 is a circuit diagram of a one-time programmable memory circuit according to some embodiments of the present disclosure.

For a more complete understanding of an array composed of the one-time programmable memories 300, refer to FIG. 3 and FIG. 11. FIG. 11 is a circuit diagram of a one-time programmable memory circuit 1100 according to some embodiments of the present disclosure. As shown in FIG. 11, the one-time programmable memory circuit 1100 includes a plurality of memory units 1110 arranged in an array, and each memory unit 1110 has the same structure.

Taking the corner memory unit 1110 as an example, it may include a one-time programmable memory 300. The one-time programmable memory 300 includes an OTP diode 310 and a control FET 320. One end of the OTP diode 310 is electrically connected to a source line $SL_n$. The gate of the control FET 320 is electrically connected to a word line $WL_n$, the first source/drain of the control FET 320 is electrically connected to a bit line $BL_1$, and the second source/drain of the control FET 320 is electrically connected to another end of the OTP diode 310.

In FIG. 11, the source lines $SL_1$-$SL_n$ are electrically connected to the circuit 1101, word lines $WL_1$-$WL_n$ are electrically connected to the circuit 1102, and bit lines $BL_1$~$BL_n$ are electrically connected to the circuit 1103. In some embodiments of the disclosure, the circuit 1101 can include a source line driver and a controller, the circuit 1102 can include a word line driver and a controller, and the circuit 1103 can include a bit line driver, a controller and a sense amplifier. In practice, for example, the sense amplifier in the circuit 1103 can sense the read current through bit line $BL_1$.

Figure 12:
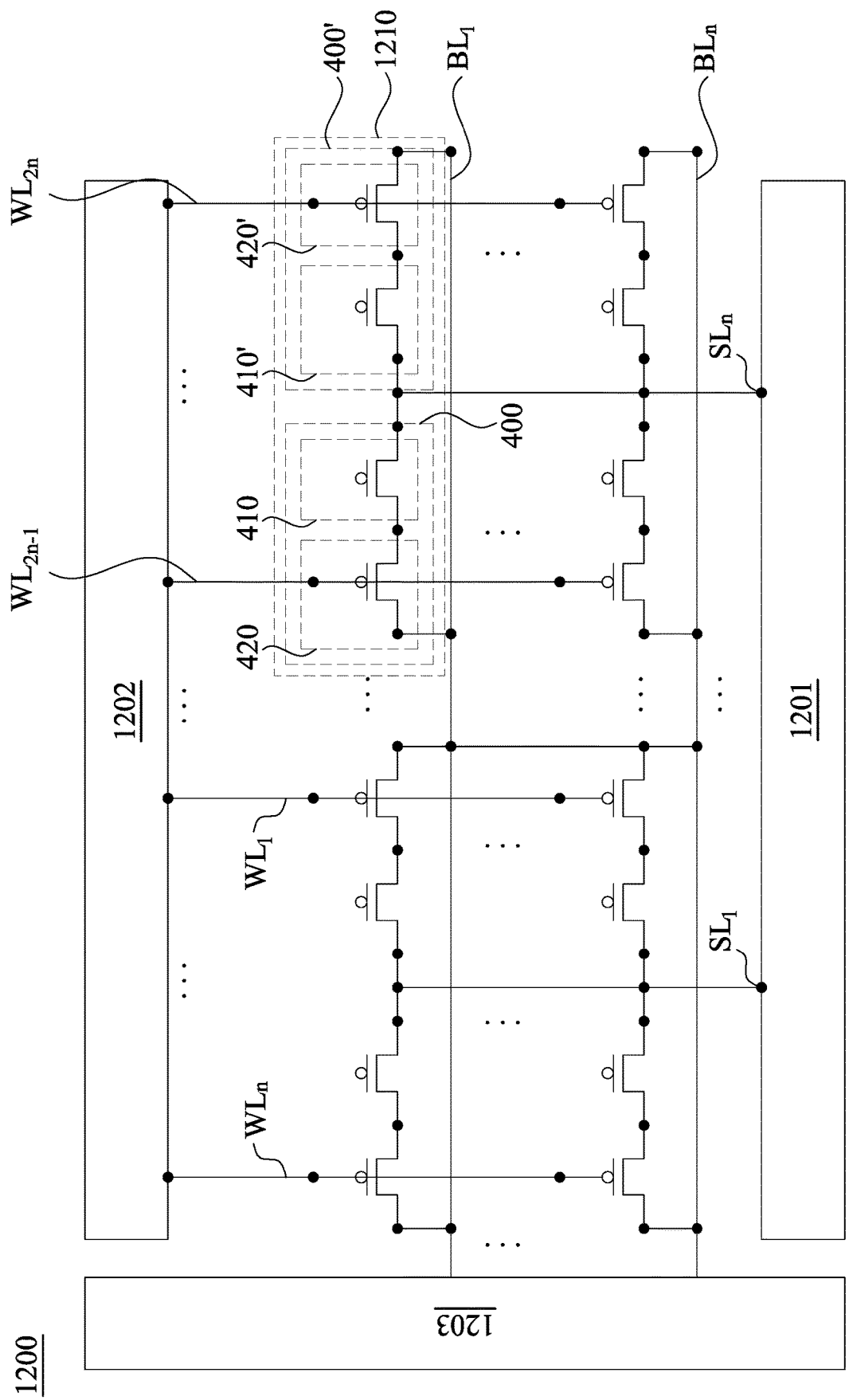
FIG. 12 is a circuit diagram of a one-time programmable memory circuit according to some embodiments of the present disclosure.

For a more complete understanding of another array composed of the one-time programmable memories 400, refer to FIG. 4 and FIG. 12. FIG. 12 is a circuit diagram of a one-time programmable memory circuit 1200 according to some embodiments of the present disclosure. As shown in FIG. 12, the one-time programmable memory circuit 1200 includes a plurality of memory units 1210 arranged in an array, and each memory unit 1210 has the same structure.

Taking the corner memory unit 1210 as an example, it may include a one-time programmable memory 400 and a one-time programmable memory 400'. In practice, for example, the internal structure of the one-time programmable memory 400 is substantially the same as the internal structure of the one-time programmable memory 400', and the one-time programmable memory 400 and the one-time programmable memory 400' are symmetrical to each other along the source line $SL_n$.

The one-time programmable memory 400 includes an OTP diode 410 and a control FET 420. One end of the OTP diode 410 is electrically connected to a source line $SL_n$. The gate of the control FET 420 is electrically connected to a word line $WL_{2n-1}$, the first source/drain of the control FET 420 is electrically connected to a bit line $BL_1$, and the second source/drain of the control FET 420 is electrically connected to another end of the OTP diode 410.

The one-time programmable memory 400' includes an OTP diode 410' and a control FET 420'. One end of the OTP diode 410' is electrically connected to a source line $SL_n$. The gate of the control FET 420' is electrically connected to a word line $WL_{2n}$, the first source/drain of the control FET 420' is electrically connected to a bit line $BL_1$, and the second source/drain of the control FET 420' is electrically connected to another end of the OTP diode 410'.

In FIG. 12, the source lines $SL_1$-$SL_n$ are electrically connected to the circuit 1201, word lines $WL_1$-$WL_{2n}$ are electrically connected to the circuit 1202, and bit lines $BL_1$~$BL_n$ are electrically connected to the circuit 1203. In some embodiments of the disclosure, the circuit 1201 can include a source line driver and a controller, the circuit 1202 can include a word line driver and a controller, and the circuit 1203 can include a bit line driver, a controller and a sense amplifier. In practice, for example, the sense amplifier in the circuit 1203 can sense the read current through bit line $BL_1$.

Figure 13:
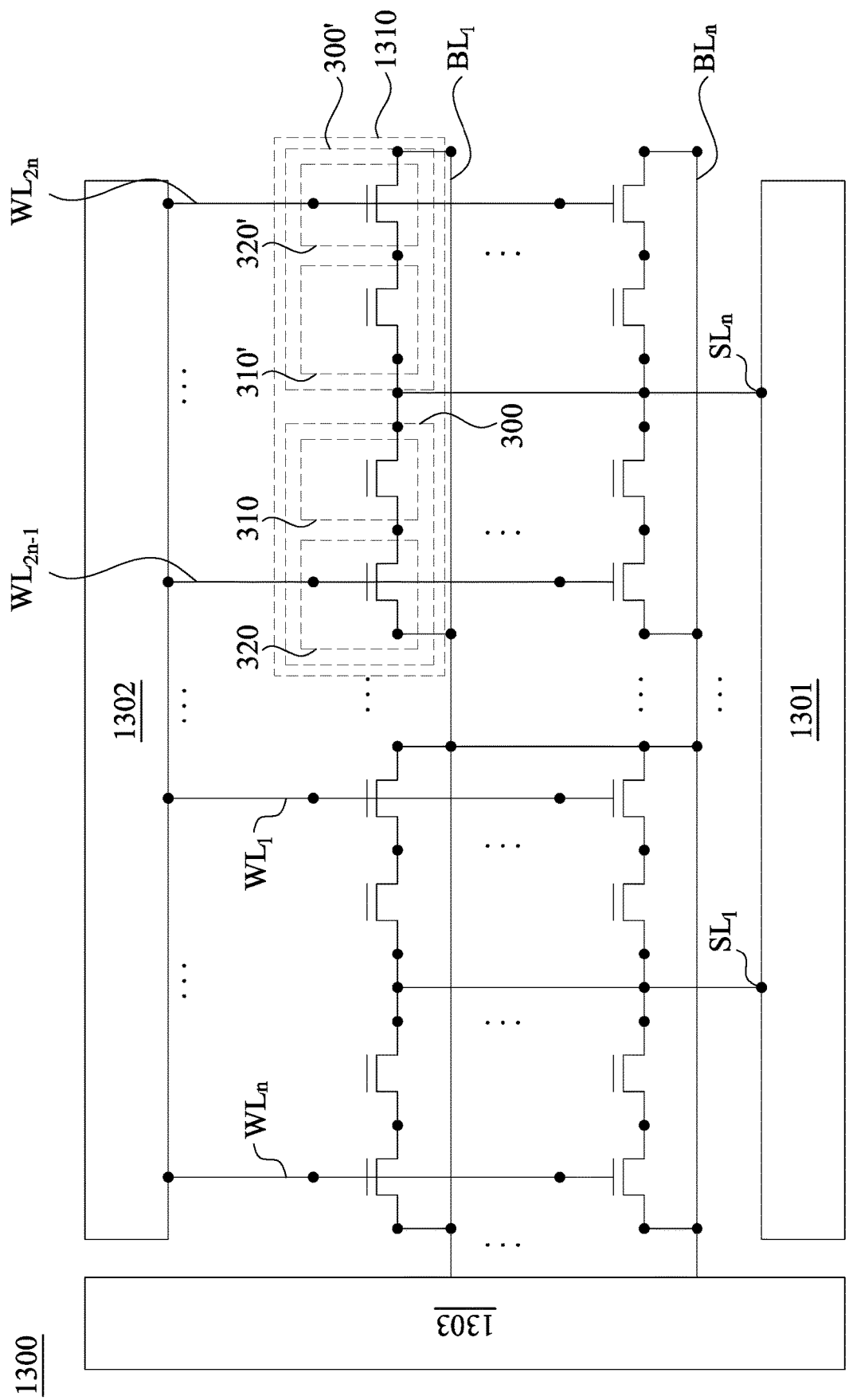
FIG. 13 is a circuit diagram of a one-time programmable memory circuit according to some embodiments of the present disclosure.

For a more complete understanding of another array composed of the one-time programmable memories 300, refer to FIG. 3 and FIG. 13. FIG. 13 is a circuit diagram of a one-time programmable memory circuit 1300 according to some embodiments of the present disclosure. As shown in FIG. 13, the one-time programmable memory circuit 1300 includes a plurality of memory units 1310 arranged in an array, and each memory unit 1310 has the same structure.

Taking the corner memory unit 1310 as an example, it may include a one-time programmable memory 300 and a one-time programmable memory 300'. In practice, for example, the internal structure of the one-time programmable memory 300 is substantially the same as the internal structure of the one-time programmable memory 300', and the one-time programmable memory 300 and the one-time programmable memory 300' are symmetrical to each other along the source line $SL_n$.

The one-time programmable memory 300 includes an OTP diode 310 and a control FET 320. One end of the OTP diode 310 is electrically connected to a source line $SL_n$. The gate of the control FET 320 is electrically connected to a word line $WL_{2n-1}$, the first source/drain of the control FET 320 is electrically connected to a bit line $BL_1$, and the second source/drain of the control FET 320 is electrically connected to another end of the OTP diode 310.

The one-time programmable memory 300' includes an OTP diode 310' and a control FET 320'. One end of the OTP diode 310' is electrically connected to a source line $SL_n$. The gate of the control FET 320' is electrically connected to a word line $WL_{2n}$, the first source/drain of the control FET 320' is electrically connected to a bit line $BL_1$, and the second source/drain of the control FET 320' is electrically connected to another end of the OTP diode 310'.

In FIG. 13, the source lines $SL_1$-$SL_n$ are electrically connected to the circuit 1301, word lines $WL_1$-$WL_{2n}$ are electrically connected to the circuit 1302, and bit lines $BL_1$~$BL_n$ are electrically connected to the circuit 1303. In some embodiments of the disclosure, the circuit 1301 can include a source line driver and a controller, the circuit 1302 can include a word line driver and a controller, and the circuit 1303 can include a bit line driver, a controller and a sense amplifier. In practice, for example, the sense amplifier in the circuit 1303 can sense the read current through bit line $BL_1$.

In view of the above, technical advantages are generally achieved, by embodiments of the present disclosure. The one-time programmable memory of the present disclosure is a 1-transistor-1-diode (1T1D) one-time programmable memory, which requires a low programming voltage. Therefore, the one-time programmable memory of the present disclosure has a high stability, and the area of its peripheral circuit is relatively small.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A one-time programmable (OTP) memory, comprising:
   an OTP diode having one end electrically connected to a source line; and
   a control field effect transistor (FET) comprising a gate, a first source/drain and a second source/drain, wherein the gate of the control FET is electrically connected to a word line, and the first source/drain of the control FET is electrically connected to a bit line, and the second source/drain of the control FET is electrically connected to another end of the OTP diode,
   wherein the control FET is an N-type control FET or a P-type control FET, and the OTP diode is an NPN diode, a NIN diode, a gate-floating N-type FET, a PNP diode, a PIP diode or a gate-floating P-type FET.

2. The one-time programmable memory of claim 1, wherein when the control FET is turned on by a control voltage of the word line, a programming voltage of the bit line makes an avalanche breakdown occur in the OTP diode, thereby forming a programmed state of the OTP diode.

3. A one-time programmable memory circuit, comprising:
   a plurality of memory units arranged in an array, each of the memory units comprising a one-time programmable memory, and the one-time programmable memory comprising:
   an OTP diode having one end electrically connected to a source line; and a control FET comprising a gate, a first source/drain and a second source/drain, wherein the gate of the control FET is electrically connected to a word line, and the first source/drain of the control FET is electrically connected to a bit line, and the second source/drain of the control FET is electrically connected to another end of the OTP diode, wherein the control FET is an N-type control FET or a P-type control FET, and the OTP diode is an NPN diode, a NIN diode, a gate-floating N-type FET, a PNP diode, a PIP diode or a gate-floating P-type FET.

4. The one-time programmable memory circuit of claim 3, wherein each of the memory units further comprises another one-time programmable memory, and the another one-time programmable memory comprises:

another OTP diode having one end electrically connected to a source line; and another control FET comprising a gate, a first source/drain and a second source/drain, wherein the gate of the another control FET is electrically connected to another word line, the first source/drain of the another control FET is electrically connected to the bit line, and the second source/drain of the another control FET is electrically connected to another end of the another OTP diode.

5. An operation method of a one-time programmable memory, the one-time programmable memory comprising an OTP diode and a control FET connected in series, and the operation method comprising steps of:

when programming the one-time programmable memory, applying a control voltage to a word line, applying a programming voltage to a bit line, and applying a zero voltage to a source line, wherein one end of the OTP diode is electrically connected to the source line, a gate of the control FET is electrically connected to the word line, a first source/drain of the control FET is electrically connected to the bit line, a second source/drain of the control FET is electrically connected to another end of the OTP diode, wherein the control FET is an N-type control FET or a P-type control FET, and the OTP diode is an NPN diode, a NIN diode, a gate-floating N-type FET, a PNP diode, a PIP diode or a gate-floating P-type FET.

6. The operation method of claim 5, wherein the control voltage turns on the control FET, the programming voltage makes an avalanche breakdown occur in the OTP diode, thereby forming a programmed state of the OTP diode.

7. The operation method of claim 5, further comprising:

when reading the one-time programmable memory, applying a working voltage to the word line, applying the zero voltage to the source line, and applying a read voltage to the bit line.

* * * * *